Nov. 5, 1968 W. E. BRAY 3,409,846

PULSE SHAPER

Filed July 1, 1966

INVENTOR
WILLIAM E. BRAY

E. Mickey Hubbard
ATTORNEY

United States Patent Office 3,409,846

Patented Nov. 5, 1968

3,409,846

PULSE SHAPER

William E. Bray, Houston, Tex., assignor to Texas Instruments Incorporated, a corporation of Delaware Filed July 1, 1966, Ser. No. 562,328
8 Claims. (Cl. 333—20)

This invention relates generally to pulse shapers, and more particularly relates to a pulse shaper for producing a pulse of precisely predetermined width having substantially identical rise and fall characteristics.

In the electronic art there are many systems which require a square pulse of predetermined amplitude and width. This is particularly true in high speed digital systems. It is a fairly simple matter to produce a pulse having a substantially square leading edge or transition. However, it is very difficult to produce a substantially square pulse. Most pulse shapers produce a pulse having a decreasing amplitude and a rounded trailing edge. It is also rather difficult to precisely control the width of a pulse.

In very high speed digital applications, the square pulses almost invariably must be transmitted through a coaxial cable or other transmission line. If the input or output impedance of the pulse shaper does not match the characteristic impedance of the transmission line to which it is connected, the shape of the pulse is further degraded due to the reflection of energy from the interface formed by the mismatched impedances. It is very difficult to design a pulse shaper having both input and output impedances which match that of a standard fifty ohm transmission line because the input and output impedances of the pulse shapers vary significantly during the production of a pulse. As a result, few if any pulse shapers can be placed directly in a transmission line so that the trigger input to the pulse shaper comes from a transmission line and the output from the pulse shaper goes to a transmission line without introducing considerable attenuation.

Accordingly, an important object of this invention is to provide a pulse shaper for producing a pulse having substantially identical rise and fall characteristics.

Another object of this invention is to provide a pulse shaper capable of producing a substantially perfect square wave.

A further object is to provide a pulse shaper for producing a pulse of a precisely predetermined width.

Another object is to provide a pulse shaper having equal input and output impedances which remain constant at all times and which can be designed to precisely match the impedance of any standard transmission line.

Another very important object of the invention is to provide a pulse shaper having the same input and output impedance as a standard coaxial cable and which can, therefore, be quickly connected in the center of a standard coaxial cable without degrading the character of the pulse produced by the pulse shaper.

A further object is to provide such a pulse shaper that employs a minimum number of simple, inexpensive components, and which can be easily and economically manufactured.

Another object is to provide a pulse shaper that isolates the D.C. component at the input of the pulse shaper from any D.C. component at the output.

In accordance with the present invention, a voltage transition is applied to the interconnected ends of the conductors of a pair of transmission line stubs of equal length. The remote end of one of the stubs is shorted between the conductor and the shield and the near end of the shield is grounded through a terminating resistor having an impedance corresponding to the characteristic impedances of the transmission line stubs. The remote end of the other stub is open and the remote end of the shield is not grounded. The near end of the shield of the second stub is then the output of the pulse shaper. When in use, both the input and output must be connected to a transmission line having the same impedance as the characteristic impedance of the transmission line stubs, or an equivalent impedance. When the input transition reaches the input of the shaper, one-half of the energy propagates down each stub. At this point, the input impedance of the shaper is equal to the impedance of the input transmission line since each stub has an impedance twice that of the input transmission line and the stubs are parallel circuits. Since one-half of the transition propagates down each transmission line stub, an immediate change in the potential of the output of the device results that is equal to one-half the transition at the input. The signal voltage propagating down the conductor of the shorted stub is reflected from the end of the stub and returns 180° out-of-phase. The signal voltage propagating down the open stub is reflected in-phase so that when it returns to the output, the output returns to its initial level. When the two reflected signals return to the input simultaneously as a result of the two stubs being the same length, one stub becomes an open circuit having an infinite impedance, and the other stub becomes a short circuit through the resistance to ground so that the input and output impedance remains constant. This is explained by the open stub, which acts capacitively, becoming fully charged on the arrival of the reflection. The shorted stub acts inductively and becomes fully charged when the reflection returns.

In accordance with more specific aspects of the invention, the transmission line stubs may be formed from coaxial cables, in which case it is desirable to also provide the coaxial cables with ferrite cores. Or the transmission line stubs may be strip lines, or any other type of transmission line utilizing a conductor and a shield.

The novel features believed characteristic of this invention are set forth in the appended claims. The invention itself, however, as well as other objects and advantages thereof, may best be understood by reference to the following detailed description of an illustrative embodiment, when read in conjunction with the accompanying drawings, wherein:

Figure 1:
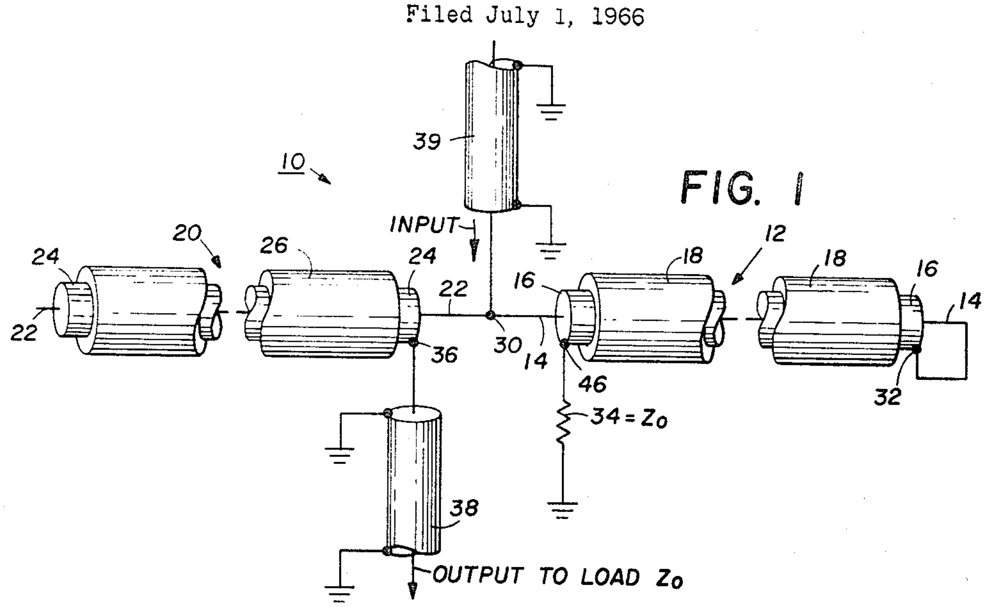
FIGURE 1 is a schematic circuit diagram of a pulse shaper constructed in accordance with the present invention.

Referring now to the drawings, a pulse shaper constructed in accordance with the present invention is indicated generally by the reference numeral 10. The pulse shaper is comprised of a first transmission line stub indicated generally by the reference numeral 12, a substantially identical second transmission line stub indicated generally by the reference numeral 20, and a resistor 34. The first stub 12 comprises a standard ferrite cored coaxial cable having a first conductor 14, a first shield 16 and a ferrite core 18. The second transmission line stub 20 is also comprised of a standard ferrite cored coaxial cable having a second conductor 22, a second shield 24 and a ferrite core 26. The junction 30 between the first and second conductors 14 and 22 is the input of the pulse shaper. The end of the first conductor 14 remote from the input junction 30 is connected to the corresponding end of the first shield 16 as represented by the connection 32 to short the end of the stub. The end of the first shield 16 adjacent to the input 30 is connected to ground by a resistor 34 having an impedance equal to the characteristic impedance of the coaxial transmission lines 12 and 20. The end of the second conductor 22 remote from the input junction 30 is open and the corresponding end of the second shield 24 is also open, i.e., is not grounded, so that the stub is considered open ended. The end of the second shield 24 adjacent to the input junction 30 forms the output of the pulse shaper as indicated by the junction 36.

In order to obtain proper operation, the output junction 36 must be connected to either a coaxial transmission line 38 having the same characteristic impedance of the coaxial cables 12 and 20, or to a resistor or other system having a matching impedance. Similarly, the input signal to the junction 30 should be applied by means of a coaxial transmission line 39 having the same characteristic impedance, or by some system having a matching impedance. It will be noted that the shields of the transmission lines 38 and 39 are grounded in the conventional manner. It should be appreciated that the spacing between the input junction 30 and the ends of the shields 16 and 24 should be kept at a minimum. Also, for purposes which will presently be described, the lengths of the first and second conductors 14 and 22 and first and second shields 16 and 24 should be matched so that a voltage transition introduced at input 30 will be reflected from the ends of the stubs and return to the adjacent ends of the shields simultaneously. The ferrite cores 18 and 26 are provided merely to make the impedance between the shields and ground as high as possible.

Figure 2:
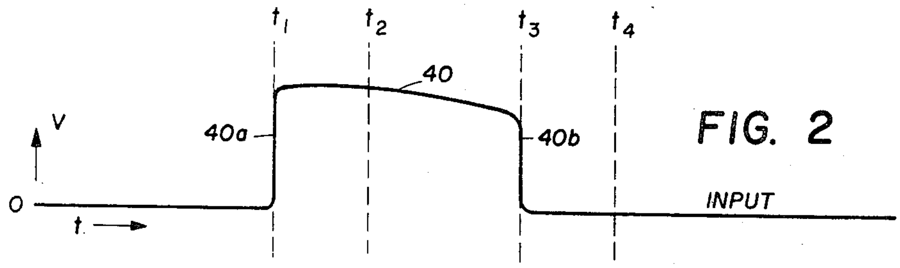
FIGURE 2 is a plot of voltage with respect to time at the input of the pulse shaper of FIGURE 1.
Figure 3:
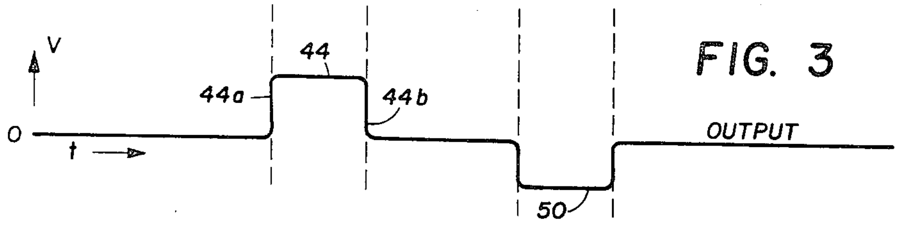
FIGURE 3 is a plot of voltage with respect to time at the output of the pulse shaper of FIGURE 1.
Figure 4:
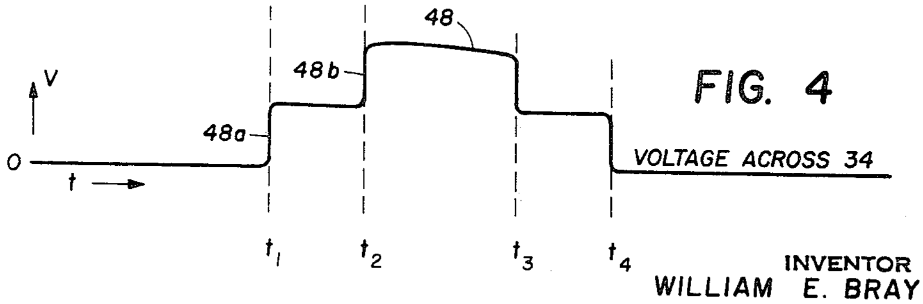
FIGURE 4 is a plot of the voltage with respect to time across the terminating resistor of the pulse shaper of FIGURE 1.

In order to understand the operation of the pulse shaper 10, assume that a positive going voltage pulse 40 (see FIGURE 2) having a rise 40*a* and a fall 40*b* is applied through the coaxial input cable 39 to the input 30 and that the rise 40*a* reaches the junction at time $t_1$ and the fall 40*b* reaches the input at time $t_3$. Assume also that the characteristic impedance of all transmission lines is fifty ohms and that resistor 34 is therefore fifty ohms. At time $t_1$, the input junction 30 will go from 0.0 volt to +4.0 volts with respect to ground. Assuming that the input 30 and the output 36 are in very close proximity, the voltage at output 36 will then go from 0.0 volt to +2.0 volts as indicated by the positive transition 44*a* on the pulse 44 (see FIGURE 3) because the 4.0 volts is divided equally by the impedance between the conductor 22 and shield 24 and the impedance between the conductor and shield of coaxial cable 38. At time $t_1$, the voltage at the input end of the first shield, point 46, is +2.0 volts with respect to ground as represented by the curve 48 because the +4.0 volts is divided equally from the conductor 14 to the shield 16 and across the resistor 34.

As the +4.0 volt transition 40*a*, with respect to ground, propagates through the conductors 14 and 22, the +2.0 volt transition 44*a* propagates through the shield 24 and the +2.0 volt transition 48*a* propagates through the shield 16. When the +4.0 volt level reaches the end of the conductor 14, it is transferred by the shorted connection 32 to the shield 16 so that the end of the shield 16 is raised from +2.0 volts to +4.0 volts with respect to ground. This +2.0 volt transition 48*b* on the shield then propagates down the shield 16 and arrives at junction 46 at time $t_2$, whereupon junction 46 goes to +4.0 volts with respect to ground. As the +4.0 volt transition, with respect to ground, propagates from the input junction 30 along the conductor 22, the +2.0 volt transition 44*a* propagates along the shield 24. When the +4.0 volt transition reaches the open end of the conductor 22, the open end of the shield 24 goes back to ground potential thus producing a −2.0 volt transition 44*b* at the end of the shield 24 which propagates back down the shield and arrives at the output junction 36 at time $t_2$, at which time the output junction 36 goes back to ground potential. It is important to note that the negative transition 44*b* at the output junction 36 at time $t_2$ is the mirror image or reflection of the positive transition 44*a* at time $t_1$. Thus if the input terminal 30 remains at the same voltage level between times $t_1$ and $t_2$, and the transition 40*a* of the input pulse is very sharp, a very square output pulse 44 can be obtained.

As the input pulse 40 degenerates to its negative transition at time $t_3$, very slight negative voltages may be produced at points 36 and 46, but these will be slight due to the slow change. Then at the rather sharp negative transition 40*b* of the pulse 40 at time $t_3$, the same procedure is repeated except that a negative pulse 50 is produced at the output 36 having an amplitude equal to one-half that of the transition 40*b*, and the junction 46 returns to ground potential in two equal increments at times $t_3$ and $t_4$, time $t_4$ being the time at which the pulses have propagated down the respective shields and back. Of course, the negative pulse 50 will customarily be of no consequence in a digital circuit and will effectively be rectified from the output signal.

It is also very important to note that at time $t_1$ the input impedance of the pulse shaper is equal to the characteristic impedance of the input transmission line 39, which it will be recalled is fifty ohms. This is true because the input 30 is connected to ground through two one hundred ohm series circuits connected in parallel, and is therefore fifty ohms. The first one hundred ohm series circuit is comprised of the fifty ohm impedance between the center conductor 22 and the shield 24 and the fifty ohm impedance between the conductor and the shield of the output transmission line 38. The other one hundred ohm circuit is comprised of the fifty ohm impedance between the conductor 14 and the shield 16 and the fifty ohm impedance of the resistor 34. Thus the input impedance of the pulse shaper 10 precisely matches that of the input transmission line 39 at time $t_1$. This impedance condition persists during the interval between times $t_1$ and $t_2$ during which one-half of the voltage transition propagates down and back each of the coaxial transmission line stubs 12 and 20. In this regard, it will be noted if the initial transition 40*a* is 4.0 volts, one-half of this transition or 2.0 volts propagates both down and back each transmission line stub. However, the 2.0 volt transition is reflected out-of-phase from the shorted end of the coaxial stub 12 and is reflected in-phase at the open end of the coaxial stub 20. When the reflected transitions arrive at points 46 and 36 simultaneously at time $t_2$, the coaxial stub 12 acts as a short circuit to the step voltage. However, the open coaxial stub 20 simultaneously acts as an open circuit with an infinite impedance so that the input impedance of the pulse shaper continues to be fifty ohms.

From the above description it will be evident to those familiar with the art that a novel and highly useful pulse shaper has been described. The only components required for the pulse shaper are two lengths of ferrite cored coaxial cable and a resistor having a matching impedance. The function of the ferrite core is to make the impedance between the shields and ground as high as possible and thus prevent loss of signal energy as it propagates along the transmission line stubs. If normal loss from a transmission line is not objectionable, the ferrite cores may be eliminated. The only precision required in fabricating the shaper is the tuning of the two stubs to the same propagation lengths, which is a relatively simple matter. Therefore, the pulse shaper 10 may be very economically produced. Further, the pulse shaper 10 is useful in a wide variety of circuits in that its input and output impedances remain constant, and a particular impedance value can be easily achieved merely by selecting a standard coaxial cable and a resistor of the proper value. Since both the input and output impedances of the pulse shaper are then standard value, it can be interposed in any transmission line having such a characteristic impedance, and accordingly is very useful as a tool around the laboratory. Since the initial transition 40*a* of a stimulating pulse can easily be made very square, the pulse shaper 10 may be used to produce virtually an ideal square pulse. Further, the width of the pulse is precisely controlled and is highly repeatable since it is dependent solely upon the tuned lengths of the shields of the two coaxial stubs. Since the input and output impedances of the pulse shaper remain constant, there is no reflected energy to distort the shape of the output pulse.

Although the simplest and most easily constructed embodiment of the invention has been described, it is to be understood that substantially any type of transmission line can be used to carry out the invention. For example, the transmission line stubs may take the form of a printed circuit or thin film circuit strip transmission lines wherein the conductors 14 and 22 are formed by a metal sheet or film of predetermined width and the shields formed by a metallized sheet or film spaced from and insulated from the conductors by a suitable insulating layer.

Although preferred embodiments of the invention have been described in detail, it is to be understood that various changes, substitutions and alterations can be made therein without departing from the spirit and scope of the invention as defined by the appended claims.

What is claimed is:

1. A pulse shaper comprising a pair of transmission line stubs having matched characteristic impedances, shields of matched length and first and second ends, the first ends of the conductor of each stub being interconnected to form the input of the pulse shaper, the second end of one stub being open and the second end of the other stub being shorted between conductor and shield, and a resistor having a matched impedance connecting the first end of the shield of the shorted stub to ground wherein the first end of the shield of the open stub will form the output of the pulse shaper.

2. The pulse shaper defined in claim 1 wherein each of the transmission line stubs comprises a length of coaxial cable.

3. The pulse shaper defined in claim 1 wherein each of the transmission line stubs comprises a length of ferrite cored coaxial cable.

4. The pulse shaper defined in claim 1 further characterized by a length of transmission line connected to the input of the pulse shaper having a matching characteristic impedance for applying an input transition to the pulse shaper, and a length of transmission line having a matching characteristic impedance connected to the output of the pulse shaper for transmitting a pulse from the pulse shaper.

5. A pulse shaper comprising a first length of transmission line having a characteristic impedance and comprised of a first conductor and a first shield having corresponding first and second ends, the first end of the first conductor being connected to the input of the pulse shaper and the second end being connected to the second end of the first shield, a resistor having an impedance equal to said characteristic impedance connecting the first end of the first shield to ground, and a second length of transmission line having said characteristic impedance and comprised of a second conductor and a second shield having corresponding first and second ends, the second shield having a length equal to that of the first shield, the first end of the second conductor being connected to the input of the pulse shaper, the second end of the second conductor being open, and the first end of the second shield being the output of the pulse shaper.

6. The combination defined in claim 5 wherein the first and second lengths of transmission line are each comprised of coaxial cable.

7. The pulse shaper defined in claim 6 wherein the coaxial cables have a ferrite core.

8. The pulse shaper defined in claim 5 further characterized by a transmission line the conductor of which is connected to the input for applying an input transition to the pulse shaper and a transmission line the conductor of which is connected to the first end of the second shield for transmitting the pulse from the pulse shaper, each of the transmission lines having a characteristic impedance matching the characteristic impedance of the first and second lengths of transmission lines.

References Cited

UNITED STATES PATENTS 3,225,223 12/1965 Martin.

ELI LIEBERMAN, *Primary Examiner.*

M. NUSSBAUM, *Assistant Examiner.*